Feb. 3, 1970 J. J. OXFORD ET AL 3,492,938
AUTOMATED COOKING UNIT
Filed June 10, 1968 4 Sheets-Sheet 1
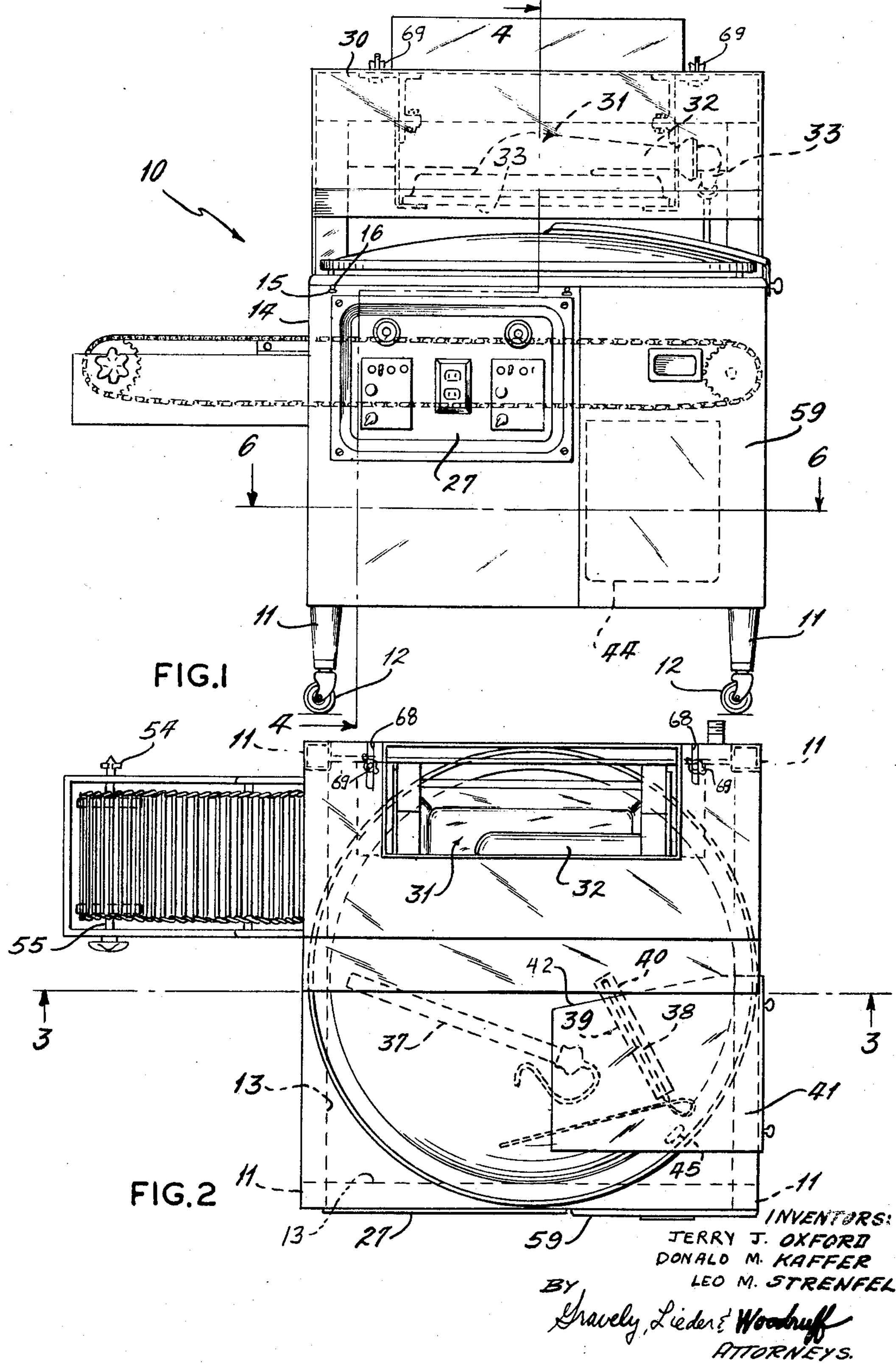
INVENTORS:
JERRY J. OXFORD II
DONALD M. KAFFER
LEO M. STRENFEL
BY Gravely, Lieder & Woodruff
ATTORNEYS.

AUTOMATED COOKING UNIT
Filed June 10, 1968 4 Sheets-Sheet 2
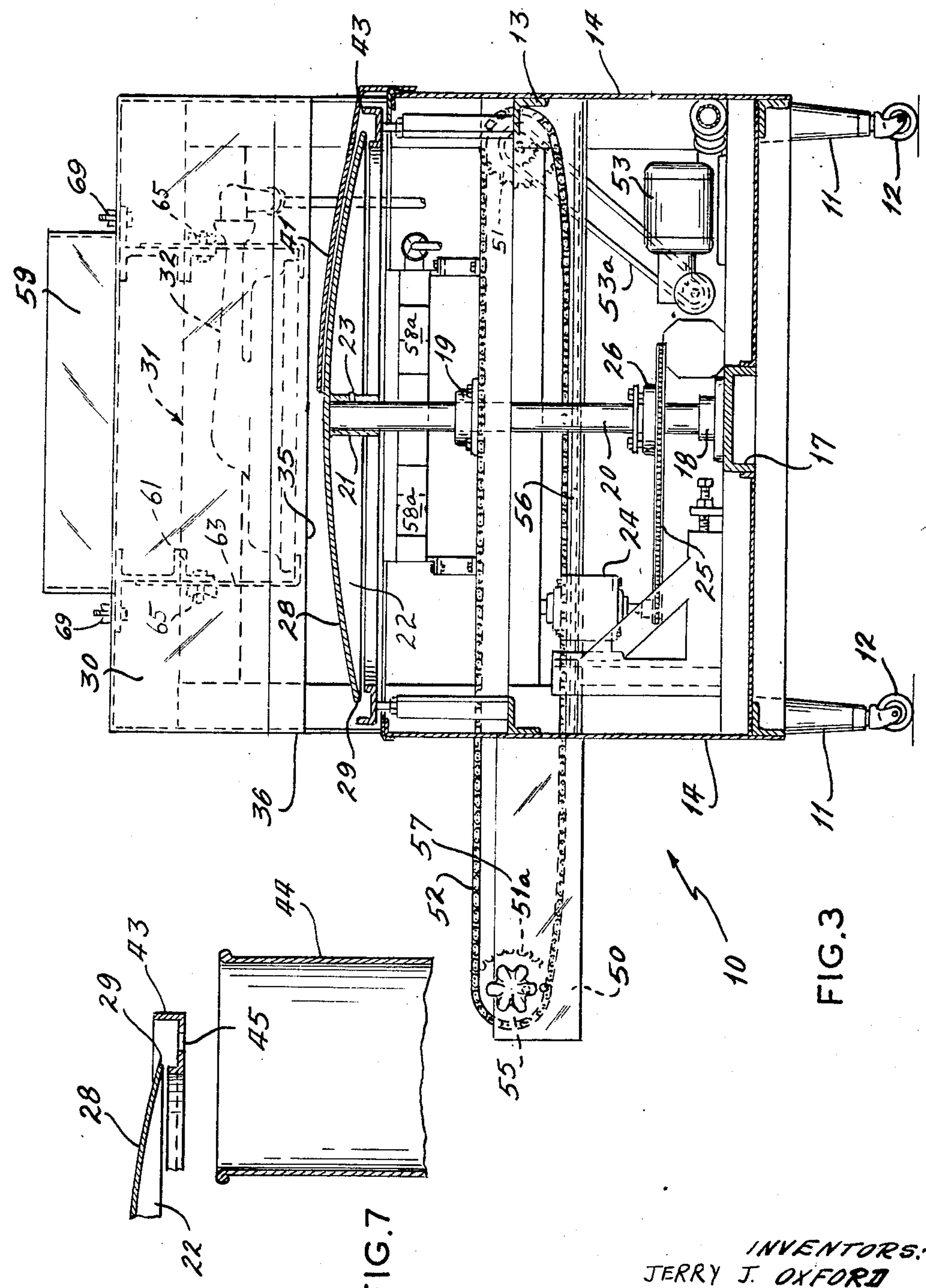
INVENTORS:
JERRY J. OXFORD
DONALD M. KAFFER
LEO M. STRENFEL
BY
Gravely, Lieder & Woodruff
ATTORNEYS.

INVENTORS:
JERRY J. OXFORD
DONALD M. KAFFER
LEO M. STRENFEL
BY
Gravely, Lieder & Woodruff
ATTORNEYS.

INVENTORS:
JERRY J. OXFORD
DONALD M. KAFFER
LEO M. STRENFEL
BY Gravely, Lieder & Woodruff
ATTORNEYS.

United States Patent Office 3,492,938

Patented Feb. 3, 1970

3,492,938

AUTOMATED COOKING UNIT

Jerry J. Oxford, Granite City, and Donald M. Kaffer, Belleville, Ill., and Leo M. Strenfel, Florissant, Mo., assignors to Oxford Manufacturing Company, Belleville, Ill., a corporation of Delaware Filed June 10, 1968, Ser. No. 735,919

Int. Cl. A47j *37/06, 37/08*

U.S. Cl. 99—339 19 Claims

ABSTRACT OF THE DISCLOSURE

An automated cooking unit for broiling and grilling hamburgers and the like comprising a rotatable grill having a sloping upper surface, an infrared heating unit positioned above the grill and a second heating means positioned below the grill, a grease catching trough positioned around the periphery of the grill and a bun toasting track enclosed in a reflective tunnel beneath the grill.

BACKGROUND OF THE INVENTION

Most hamburger grilling is still done today on a standard flat grill which requires an operator to turn the patties. There is available an endless open mesh chain grill but this device, although it has some commercial acceptance, has the drawback of being a fire hazard because the grease from the cooking patties drops directly onto an open flame, and it is time consuming to clean because of the chain mesh structure.

It is, therefore, a principal object of the present invention to provide a device for cooking hamburgers, steaks, chops, pancakes and the like in a fast efficient manner. A further object is to provide an easily cleaned, safe, continuous broiling and grilling device in which the grilling surface is self-cleaning and which includes a tunnel for continuously toasting and softening buns. Another principal object is to provide a rotatable circular grill having a continuous upper surface in which the center is higher than the periphery with a grease catching trough positioned around the periphery and including a device for removing cooked objects from the grill and storing the same while maintaining their warmth. Still another object is to provide a rotatable grill with an infrared heater above the grill and a second burner below the grill to maintain the grill at a predetermined temperature without heat build up on the grill. These and other objects and advantages will become apparent hereinafter.

SUMMARY OF THE INVENTION

The present invention comprises an automated cooking unit having a rotatable sloped grill with an infrared broiler above the grill and a second heat source below the grill.

The invention also consists in the parts and in the arrangements and combinations of parts hereinafter described and claimed. In the accompanying drawings which form part of the specification and wherein like numerals and letters refer to like parts wherever they occur:

FIG. 1 is a front view of the present invention;

FIG. 2 is a plan view;

FIG. 3 is a vertical sectional view taken along line 3—3 of FIG. 2;

FIG. 7 is a fragmentary sectional view of the grease disposal arrangement.

DETAILED DESCRIPTION

Figure 4:
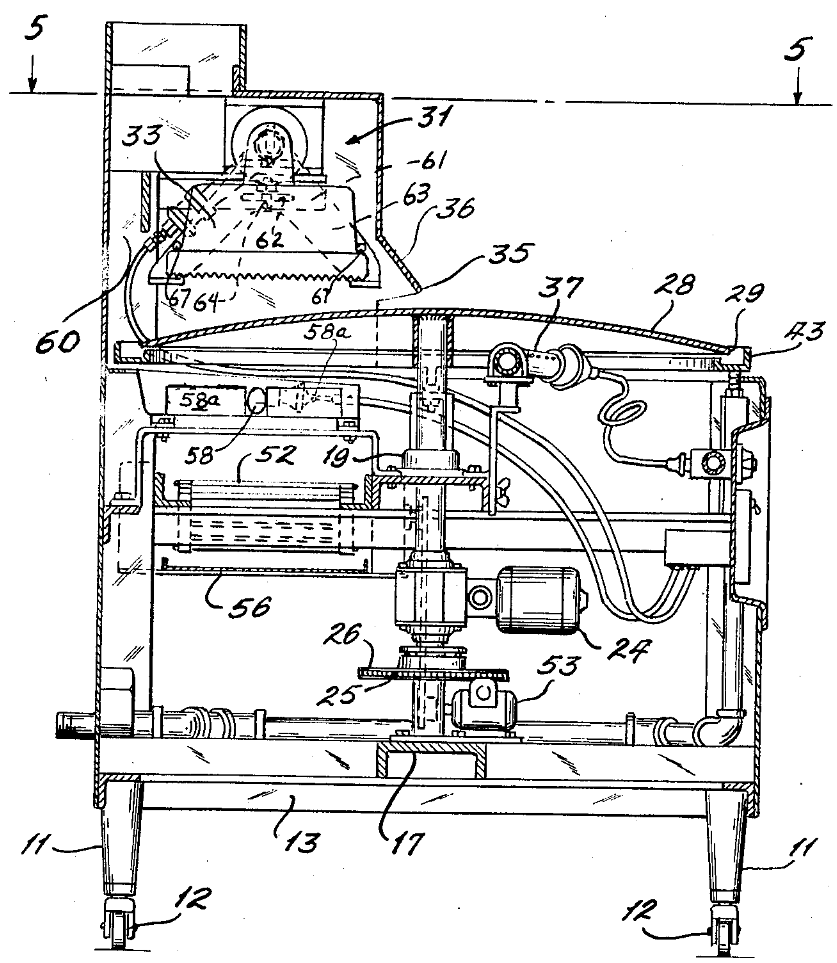
FIG. 4 is a vertical sectional view taken along line 4—4 of FIG. 1.
Figure 5:
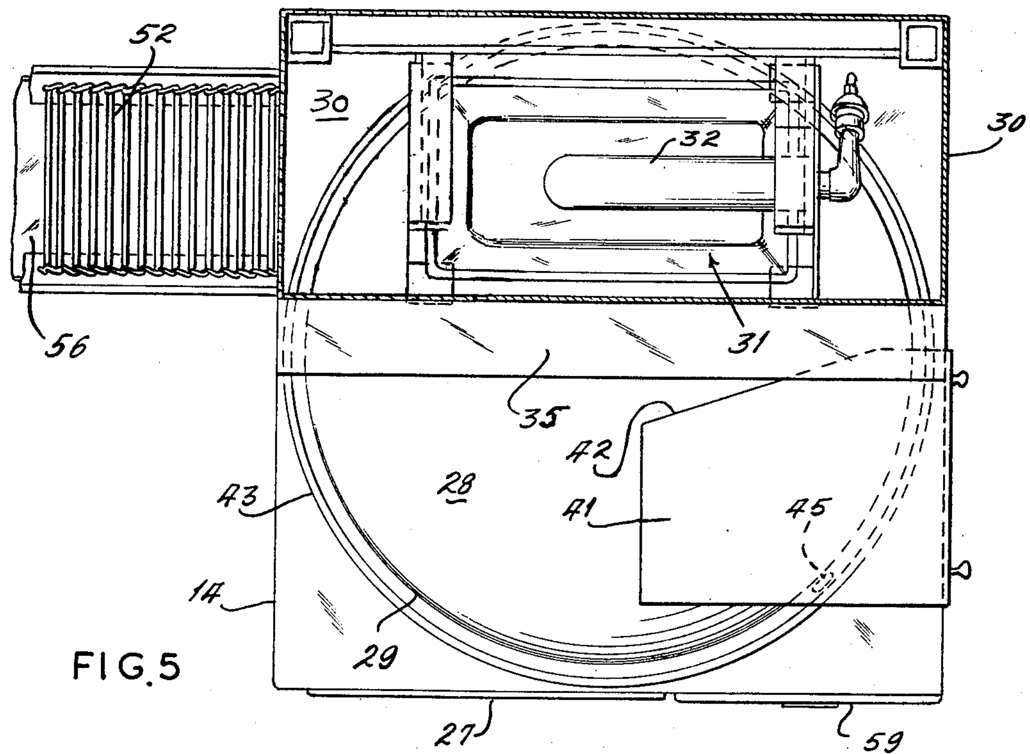
FIG. 5 is a fragmentary horizontal sectional view taken along line 5—5 of FIG. 4.
Figure 6:
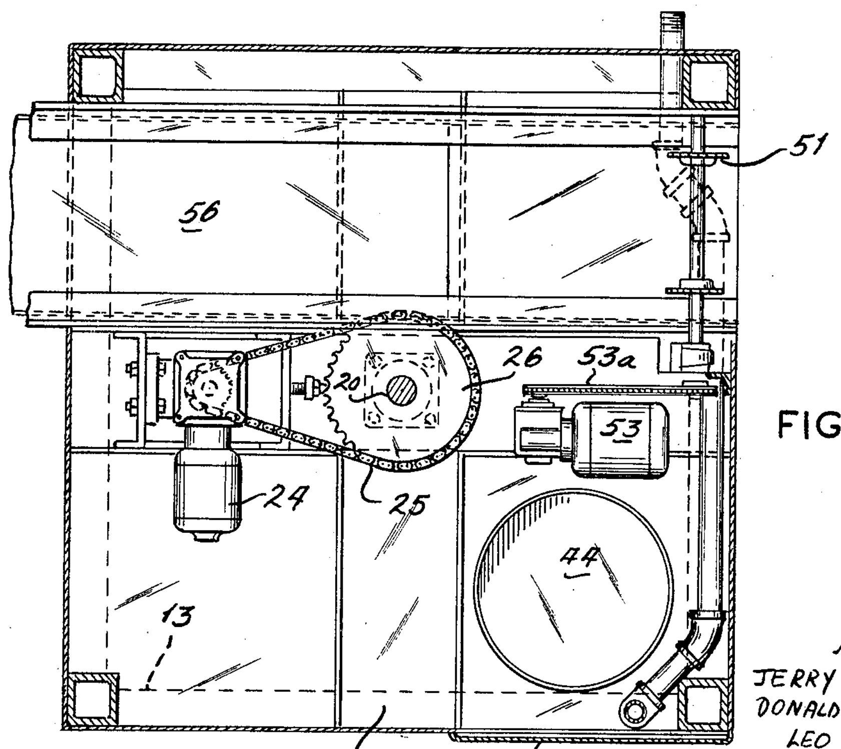
FIG. 6 is a fragmentary horizontal sectional view taken along line 6—6 of FIG. 1 and including a portion of the bun toaster assembly with the support chains removed.

The present invention comprises an automated cooking unit which broils and cooks hamburgers, steaks, chops and the like. The device is indicated generally by the numeral 10 and includes a support structure comprising legs 11 having rollers 12 and vertically spaced lateral and longitudinal frame members 13 connecting the legs 11 to form a support structure. On the outside of the support structure are removable panels 14 which have keyshaped openings 15 at the upper edges to fit over keys 16 positioned in the frame members 13. This allows the panels 14 to be rapidly removed to provide access to the interior of the support structure for replacement or repair of motors, etc., or cleaning of parts.

Positioned in the center of the structure on a support membet 17 is a lower shaft bearing 18 which, with an upper thrust bearing 19, rotatably support a vertically positioned shaft 20. The top of the shaft 20 fits into a socket 21 provided on the under surface of a grill 22 and is connected thereto by a key 23 so that rotation of the shaft 20 rotates the grill 22. A motor 24 drives the shaft 20 through a drive chain 25 and sprocket 26 fixed to the shaft 20. The speed of the shaft 20 is controlled through a rheostat on a control panel 27 which also houses controls for the burners. The motor 24 can be stopped or reversed so as to drive the shaft 20 in opposite directions.

The grill 22 has a continuous upper cooking surface 28 which preferably is curved from a crown at the center outwardly and downwardly toward an outer peripheral edge 29. The grill 22 can be easily removed from the shaft 20 for cleaning by merely unkeying and lifting the same off of the shaft 20. A specific example of the pitch of a 36" diameter grill surface 28 has the edge 29 ⅞ inch below the center. Other pitches may be used.

Positioned above the grill 22 over slightly less than one-half the surface area thereof is a hood 30 which supports an infrared heating unit 31. The infrared unit includes a gas or electric burner 32 and a ceramic reflecting and radiating surface 33. The burner 32 and ceramic unit 33 are vericaly, laterally and angularly adjustable by means of slots and lock nuts. The surface 33 is above the lower edge of the hood 30 and of less size than the open underside of the hood. At the forward side of the hood 30 extending outwardly and downwardly over the grill 22 is a reflector 36 which directs heat from the infrared unit 31 back onto the grill surface 28. The heating unit 31 is made and sold by Corning under the trademark Cercor.

To more particularly describe the aforesaid adjustments, positioned in the upper ends of the back leg members 11 are brackets 60 which have forwardly projecting arms 61 provided with lateral slots 62. End supports 63 with vertical slots 64 are connected to the lateral slots 62 by adjustable fastening means such as wing nuts 65. Inwardly projecting racks 66 between the end supports 63 support the burner 32 and the radiating surface 33. Adjustable rods 67 between the supports 63 help hold the burner 32 and the supports 63 in assembled relation.

The hood 30 is adjustable outwardly from the back of the grill 22 by means of slots 68 and screws 69 on the bracket arms 61.

Positioined beneath the grill 22 is a second gas-fired burner 37 which is controlled by a thermostat 38 positioned adjacent to the under surface of the grill 22 at a point immediately before the cooked objects are removed from the grill 22. The thermostat 38 is mounted on a support structure 39 which is laterally and vertically adjustable and lies in an open top trough 40. The second burner 37 also is adjustable toward or away from the underside of the grill 22. With the thermostat 38 set, the burner 37 keeps the grill 22 at a predetermined temperature. The upper heating unit 31 is turned on only when product is to be cooked, and because of its rapid heat-up and cooling, there is no heat build up in the grill 22. One can touch the surface 33 two minutes after it has been turned off.

In operation a hamburger is normally positioned on the grill 22 prior to its passing beneath the infrared heating unit 31 and is removed by a scoop 41 which is generally a flat surface upwardly inclined from the grill 22 and has a cleaning edge 42 adjacent to the grill 22 to remove cooked objects therefrom. Cooked product is stored on the flat planar portion of the scoop 41. Because of its close relation to the grill 22, product on the scoop 41 tends to stay warm before it is dressed onto buns. The edge 42 also has the purpose of scraping the top surface 28 of the grill 22 to clean the same constantly.

Positioned around the outer periphery of the grill 22 is a continuous trough 43 which has a front edge about or slightly above the edge 29 of the grill 22. Grease from the grill 22 rolls over the periphery 29 of the grill 22 and drops into the trough 43 because of the slope to the grill surface 28 at a point most removed from the open flame second burner 37. A grease collecting can 44 is positioned so that grease drops through an opening 45 in the trough 43 into the can 44 and is not a fire hazard. The trough 43 is vertically adjustable toward and away from the under surface of the grill 22.

The hazard of fire is further lessened because the infrared unit 31 has rapid heat-up and cool-down and the thermostat 38 controls the operation of the second burner 37 to keep the grill 22 at a predetermined temperature. The rapid cool-down of the infrared unit 31 does not allow heat to build up in the grill 22, which would increase the fire hazard.

Positioned beneath the grill 22 at the rear of the unit 10 and also beneath the infrared burner 31 is a bun toasting and warming arrangement. This structure comprises a frame 50 which has rollers 51 and 51*a* mounted at each end and an open mesh endless chain 52 stretched over the rollers 51 and 51*a*. The leading roller 51 is driven by a motor 53 and a drive belt 53*a*. Each of the rollers is easily removed by removing a lock plate 54 from the end of a roller shaft 55 and removing the shaft 55 so that the chain 52 can be taken off and easily cleaned. Positioned beneath the chain 52 is a reflective removable crumb collecting panel 56. Enclosing the chain 52 at the sides and the top are reflective panels 57 creating an oven effect as the buns on the chain 52 go through so that the buns are not merely toasted, but also are softened. In conventional cookers steam usually is required for this purpose. If one does not desire to use the bun toaster, it can be removed. The unit 10 also can be constructed without the bun toasting arrangement.

The chain rollers 51 and 51*a* are vertically adjustable toward and away from the underside of the grill 22 by means of a plurality of vertically spaced openings in the frame 50. This, of course, causes the chain 52 to be similarly adjustable.

The front and top members act as heat shields as well as reflectors to protect the thermostat, etc., and to give the oven effect.

Shortly after the bun enters the toasting tunnel hereinbefore described, a heating structure is encountered. This comprises a burner 58 and adjacent ceramic brick 58*a*. The flame from the burner 58 is projected onto the under surface of the brick 58*a* and heat from the brick 58*a* is reflected directly onto the buns runnings on the chain 52.

The bun toaster also can be used to warm or cook frozen items.

While a vent 59 can be provided on the top of the unit 10, normally none is required because grease from the grill 22 is burned up by the infrared heating unit 31.

Both of the motors 24 and 53 and the controls on the control panel 27 are positioned in a remote location from the heating units to eliminate heat caused problems in the controls. Positioned on the front of the unit 10 is a removable panel 60*a* which provides access to the grease catching can 44 for easy cleaning thereof.

The motor 53 for driving the chain 52 is reversible and the bun toasting frame 50 can be reversed so as to make the chain 52 suitable for right hand loading rather than the left hand loading shown in the drawings.

What is claimed is:

1. An automated unit for cooking comprising
(A) a rotatable grill for receiving objects to be cooked,
(B) means for rotating said grill,
(C) means for collecting grease from the periphery of said grill,
(D) an infrared heat source positioned over the grill, and
(E) a second heat source positioned beneath the grill, said grill having a continuous cooking surface which is sloped downwardly towards the periphery so that grease thereon will drain towards the periphery thereof.

2. The structure of claim 1 wherein the grill surface is convex.

3. The structure of claim 2 wherein the grill is removably positioned in the unit.

4. The structure of claim 1 wherein the grease collecting means is a vertically adjustable gutter having an outer rim higher than the edge of the grill and emptying into a grease container.

5. The structure of claim 4 wherein the grease container is located at a point remote from the burner to lessen fire hazard.

6. The structure of claim 5 including a removable door on the frame to permit access to the grease receptacle.

7. The structure of claim 1 including means for removing cooked objects from the grill.

8. The structure of claim 7 wherein the removing means is an inclined flat surface having an edge adjacent to the cooking surface of the grill to remove and store cooked objects and keep them warm.

9. The structure of claim 1 including a bun toaster positioned beneath the grill.

10. The structure of claim 9 including a support structure for the burner, and lift-off panels enclosing the support structure for rapid removal to provide access to the inside of the structure for cleaning, said structure housing the means for rotating the grill, control means therefor, the second heat source, controls therefor, and including a passage for the bun toaster which comprises an endless track passing through the structure beneath the grill.

11. The structure of claim 1 including a stand supporting the grill, and means for adjusting the relative positions of the grill and the infrafed heat source.

12. The structure of claim 1 wherein the direction of rotation of the grill is reversible.

13. The structure of claim 1 wherein the infrared heat source is angularly adjustable so as to direct the heat rays over the grill surface and is vertically and laterally adjustable with respect to the grill surface.

14. The structure of claim 1 including a bun warmer and toaster comprising an endless open mesh chain support for the buns, means for driving said support beneath the grill through a tunnel having a heat generating area and an inner reflective surface to soften and toast the buns.

15. The structure of claim 14 including a removable crumb catching base for said tunnel.

16. The structure of claim 14 wherein the chain support is adjustable toward and away from the underside of the grill.

17. The structure of claim 14 wherein the chain support is removable and is reversible in its direction of movement.

18. The structure of claim 1 including a thermostat positioned beneath the grill to control the operation of the second burner to keep the grill at a predetermined temperature.

19. The structure of claim 18 wherein the thermostat is positioned in a trough-shaped bracket which is adjustable with respect to the underside of the grill.

References Cited

UNITED STATES PATENTS

| | | | |
|---|---|---|---|
| 1,696,613 | 12/1928 | Shroyer. | |
| 2,168,773 | 8/1939 | Parr | 99—423 |
| 2,438,699 | 3/1948 | Groetchen | 99—423 |
| 2,453,385 | 11/1948 | Rone | 99—423 |
| 2,542,265 | 2/1951 | Staples | 99—425 XR |
| 2,556,808 | 6/1951 | Harris | 99—425 XR |
| 2,817,286 | 12/1957 | Lisbon | 99—423 |
| 2,920,177 | 1/1960 | Brane | 99—423 XR |
| 3,204,549 | 9/1965 | Palowsky | 99—391 |
| 3,277,813 | 10/1966 | Luscher | 99—386 |

FOREIGN PATENTS

| | | |
|---|---|---|
| 631,398 | 11/1949 | Great Britain. |

BILLY J. WILHITE, Primary Examiner

U.S. Cl. X.R.

99—400, 423, 425, 446; 126—41